United States Patent [19]

Cronk et al.

[11] Patent Number: 5,645,622

[45] Date of Patent: Jul. 8, 1997

[54] METHOD OF ANNEALING A FIBER WITHIN A COILED TUBE TO THEREBY MAKE A FIBER COIL FOR A FARADAY-EFFECT CURRENT-SENSOR

[75] Inventors: Bryon J. Cronk, Hudson, Wis.; Ted F. Hutchinson, Cedar Park, Tex.; Dale R. Lutz, Maplewood, Minn.; Trevor W. MacDougall, Cedar Park, Tex.; James R. Onstott, Hudson, Wis.

[73] Assignee: Minnesota Mining and Manufacturing Company, St. Paul, Minn.

[21] Appl. No.: 407,905

[22] Filed: Mar. 21, 1995

Related U.S. Application Data

[62] Division of Ser. No. 205,880, Mar. 3, 1994, Pat. No. 5,492,552.

[51] Int. Cl.⁶ .......................... C03B 23/20; C03B 23/00; C03B 37/00
[52] U.S. Cl. .................. 65/378; 65/385; 65/402; 65/102; 65/117; 65/407
[58] Field of Search .................. 65/378, 385, 402, 65/407, 102, 117

[56] References Cited

U.S. PATENT DOCUMENTS

| | | | |
|---|---|---|---|
| 4,298,245 | 11/1981 | Aulich et al. | 350/96.29 |
| 4,695,306 | 9/1987 | Hakoun | 65/378 |

FOREIGN PATENT DOCUMENTS

| | | |
|---|---|---|
| 0044572 | 7/1981 | European Pat. Off. . |
| 0044572 | 1/1982 | European Pat. Off. . |
| 57-198407 | 12/1982 | Japan . |
| PCT/GB87/ 00345 | 12/1987 | WIPO . |

OTHER PUBLICATIONS

Article entitled "Faraday Effect Sensors: The State of the Art" by G.W. Day and A.H. Rose, National Bureau of Standards, Boulder, CO 80303, SPIE vol. 985, Fiber Optic and Laser Sensors VI (1988) pp. 138–150.

*Primary Examiner*—John Hoffmann
*Attorney, Agent, or Firm*—Gary L. Griswold; Walter N. Kirn; Gerald F. Chernivec

[57] ABSTRACT

Silica tubes and sleeves are used to protect fusion splices between the ends of the fiber coil and polarizing fibers. Use of silica for most of the subassembly components matches the coefficients of thermal expansion of the subassembly to that of the fiber coil, and also allows the coil to be annealed at extremely high temperatures. Annealing yields fiber coils of lowered birefringence, particularly when used with spun fibers. Ferrules are used to adjust the angular orientation of the fibers with respect to their planes of polarization.

4 Claims, 3 Drawing Sheets

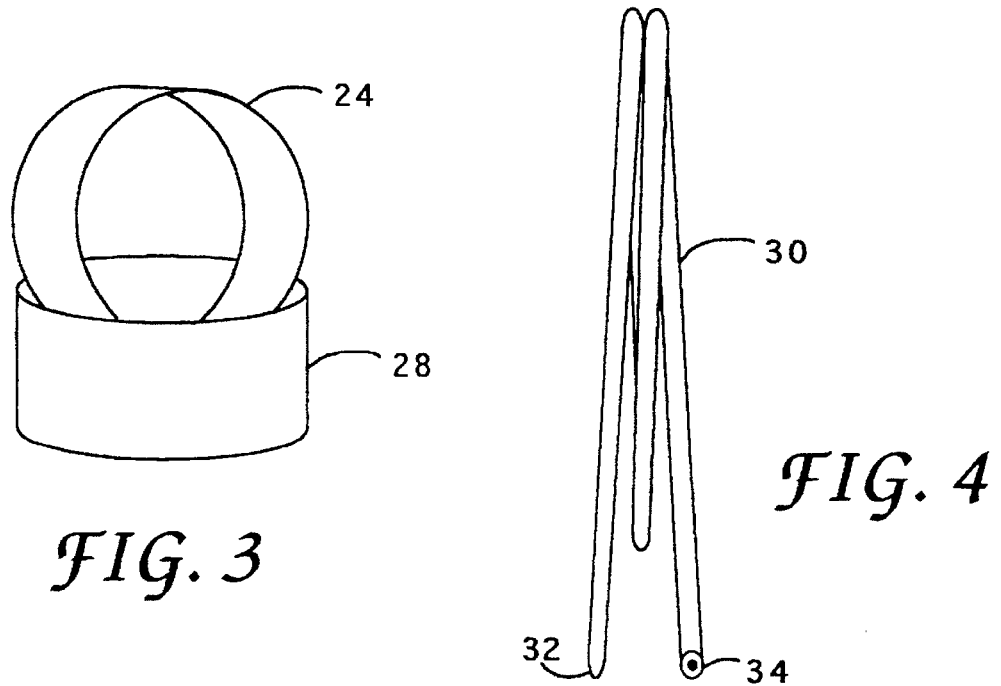
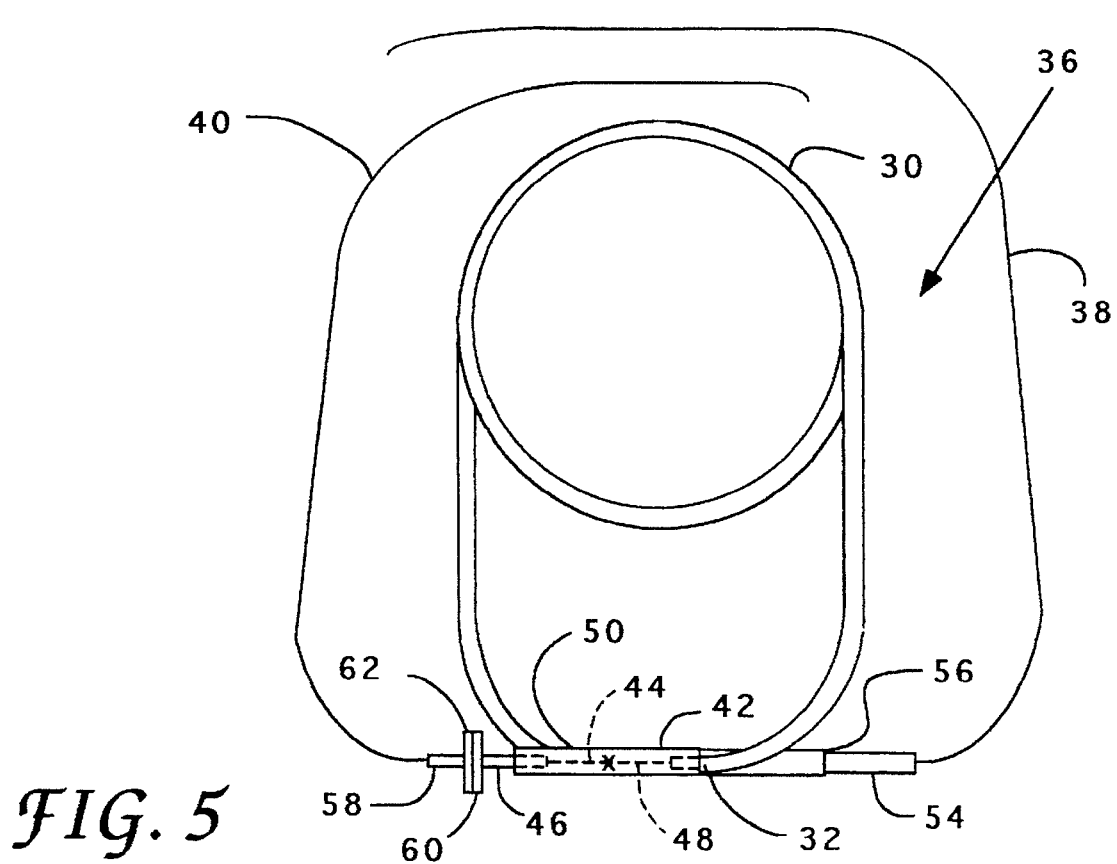

METHOD OF ANNEALING A FIBER WITHIN A COILED TUBE TO THEREBY MAKE A FIBER COIL FOR A FARADAY-EFFECT CURRENT-SENSOR

This is a division of application Ser. No. 08/205,880, filed Mar. 3, 1994, now U.S. Pat. No. 5,492,552.

BACKGROUND OF THE INVENTION

1. Field of the Invention

The present invention generally relates to implements used to hold or support articles being heated in an oven, and more particularly to a form or holder which retains a coiled optical fiber during an annealing process, and to the subsequently produced coil subassembly for a Faraday-effect magnetic field sensor.

2. Description of the Prior Art

Optical fibers which are sensitive to magnetic fields are known in the art, and are increasingly being used as optical current transducers (OCT's) for electric power utilities. A typical OCT uses a single-mode fiber formed into a coil surrounding the electrical conductor. The polarization of any light traversing the fiber coil shifts, in response to the change in any current flowing through the conductor, as a result of the magneto-optic "Faraday" effect. Further discussion of field-sensitive optical fibers is provided in U.S. Pat. No. 5,051,577 assigned to Minnesota Mining and Manufacturing Co. (3M—assignee of the present invention).

An optical medium becomes less suitable for use in a Faraday-effect sensor as its linear birefringence increases, which makes the coil more sensitive to external magnetic fields and distorts the polarized light signal. Care is particularly required in fiber selection since the formation of loops of a fiber into a coil introduces physical stresses which may further increase birefringence. One conventional method of reducing linear birefringence relies upon relieving or eliminating internal stresses present in the fiber coil. Such stresses may be produced by bending forces or transverse pressure applied to the fiber during manufacture, as well as from the stress induced when the coil is formed. Improvement in the performance of field-sensing optical fiber coils is consequently possible by annealing the coils at a temperature at which stress relaxation occurs.

A convenient implement used in annealing fiber coils may be constructed from a machinable ceramic material such as MACOR, sold by Corning, and consists of a ceramic plate having a pair of channels machined or molded in the upper surface, leading to a circular groove, as described in the literature (e.g., vol. 9, J. Lightwave Tech. pp. 1031–1037). The groove forms a cylindrical wall about which the fiber may be loosely wound. After the fiber coil has been annealed, it is removed from the plate and placed in the sensor assembly. While the surface of this plate may be precisely machined, the use of a ceramic plate presents several problems. First of all, it limits the temperature of the annealing cycle to around 850° C., well below the usual annealing temperature for pure silica, which comprises the bulk of an optical fiber. This lower temperature requires 50–100 hours to sufficiently anneal the fibers, resulting in a slow process with high energy cost. A second problem is that the plate is very fragile and easily broken, particularly if it is repeatedly subjected to heating up to temperatures of 800° C. or more. Also, the large differential between thermal expansion coefficients of the ceramic material and silica optical fibers can lead to breakage of the fibers during annealing. Silica holders have not been used, perhaps due to the difficultly in machining such material. A final problem is that it is difficult to remove the fiber coil and transport it to the sensor assembly without damaging it or inducing stresses on the fiber which can increase birefringence. It would, therefore, be desirable to devise a holder for a fiber optic coil which would overcome the limitations of ceramic holders, and yet still not be difficult to fashion into an appropriate shape. It would be further advantageous if the holder design would avoid or minimize any damage to the fiber coil during fabrication of the sensor subassembly.

SUMMARY OF THE INVENTION

The present invention provides a holder for annealing fiber optic coils comprising a silica cylinder or ring mounted on, or formed in, a silica substrate, such as a flat plate. The fiber is wound around the cylindrical wall of the ring, which may be molded to precise dimensions. The ring (and substrate) may have a hole therein to allow passage of a conductor whereby the ring (and substrate) may be retained with the fiber coil and incorporated into a Faraday-effect sensor package. The plate may have one or more channels sandblasted or ground therein to retain the fiber ends during annealing, or have other surface structures for supporting the fiber ends. The substrate may itself be another ring which supports the first ring in a vertical position, allowing the fiber ends to hang downward during annealing.

In an alternative embodiment, the holder takes the form of a coiled tube also formed of silica. The fiber coil may be annealed in the tube, and the coil and tube retained together as a subassembly, the tube thereafter serving to protect the coil. The tube may have a sufficiently high pitch to space adjacent loops in the coil far enough apart to allow placement of the subassembly around an "endless" current-carrying conductor. Additional quartz tubes may be used to protect the ends of the fiber coil, which are spliced to polarizing ($P_Z$) or polarization-maintaining ($P_M$) fibers, and to align the ends of these fibers with the ends of the coiled silica tube. Means are also provided to ensure that the end(s) of the fiber coil are rotationally aligned at the proper angle to the $P_Z$ or $P_M$ fibers.

BRIEF DESCRIPTION OF THE DRAWINGS

The invention will best be understood by reference to the accompanying drawings, wherein:

FIG. 3 is a perspective view of yet another embodiment of the present invention, wherein the coil ring is mounted on another ring forming the substrate;

FIG. 4 is a side view of still another embodiment of the present invention, wherein the holder comprises a coiled tube; and FIG. 5 is a front elevational view of the tubular housing of FIG. 4, with other components forming a coil subassembly for an optical current transducer.

DESCRIPTION OF THE PREFERRED EMBODIMENT

Figure 1:
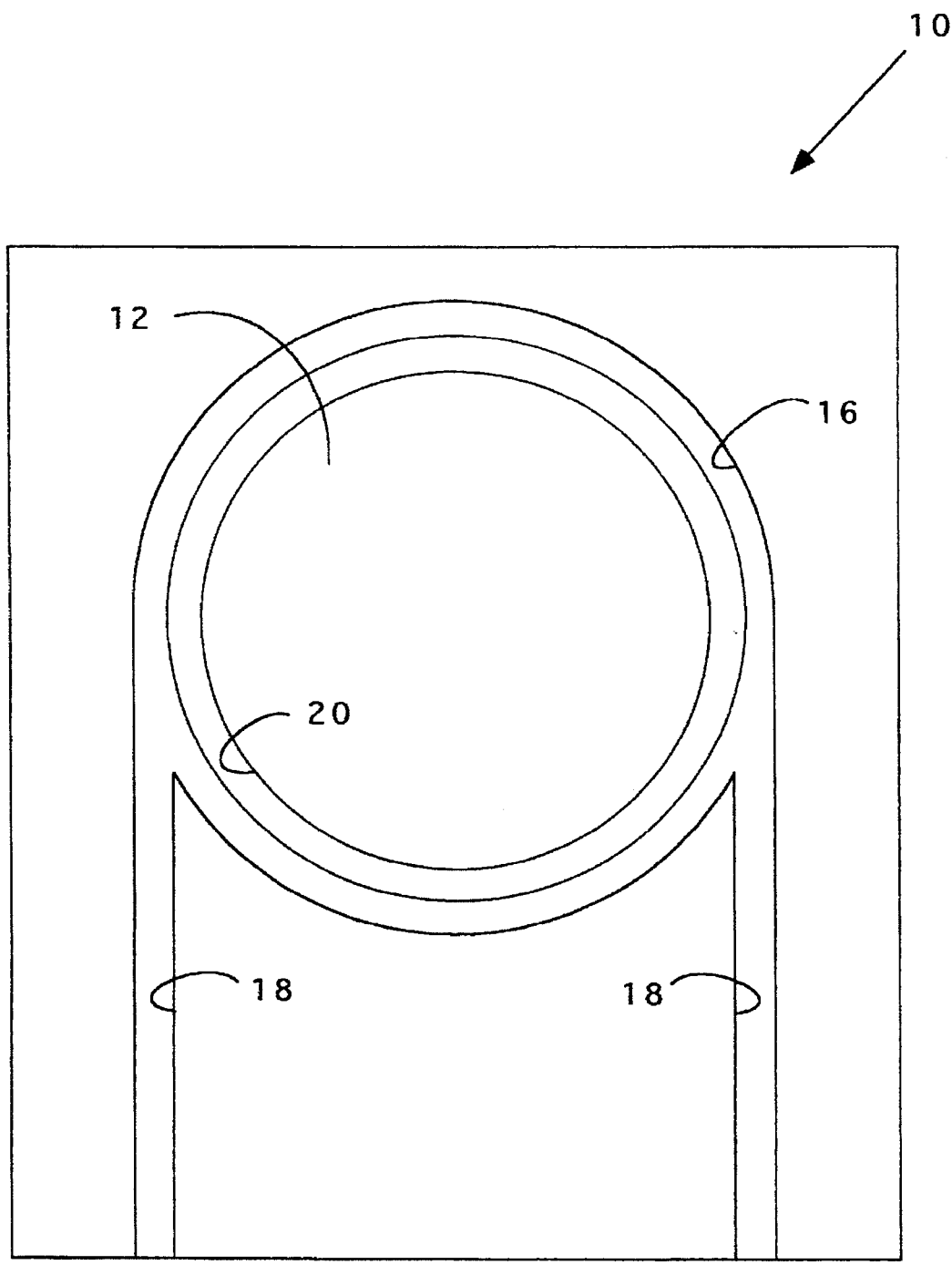
FIG. 1 is a perspective view of one embodiment of the fiber coil holder of the present invention, wherein the coil ring is formed in the surface of a flat substrate.

With reference now to the figures, and in particular with reference to FIG. 1, there is depicted one embodiment 10 of the fiber coil holder of the present invention. Holder 10 is generally comprised of a cylinder or ring 12 formed of silica, whether amorphous or crystalline (quartz), and a silica substrate which may take the form of a generally rectangular plate 14. In this embodiment, ring 12 is formed integrally with plate 14 by sandblasting a circular groove 16 in the upper surface of plate 14. Two channels 18 may also be sandblasted into the surface to provide guides for the terminal ends of the fiber coil. Sandblasting may be accomplished using stencils which are temporarily adhered to the surface of plate 14. Holder 10 is used as a mold or form for annealing by loosely winding an optical fiber around the cylindrical wall 20 formed by ring 12. Use of silica for all components in the holder assembly permits the annealing process to take place at much higher temperatures (e.g., 1000° C. to 1250° C.), which significantly reduces the annealing time and overall energy consumption. Also, use of silica for ring 12 eliminates the thermal expansion mismatch associated with prior art annealing forms which can lead to fiber breakage. After the annealing step is complete, the coil is ready for subsequent testing and fabrication into a subassembly for a Faraday-effect current sensor (either polarimetric or interferometric).

While holder 10, as well as the other embodiments of the present invention, may be used to anneal nearly any type of fiber, it can be used to fabricate superior coil subassemblies when spun optical fibers are used having an effective linear beat length of 100 meters or more. Details of the manufacture of these types of fibers are discussed in more detail in U.S. Pat. No. 5,463,317, incorporated by reference. The annealing process is preferably carried out in an air-filled oven or kiln, with a temperature in the range of 550°–1250° C., most preferably 850°–1050 ° C. Prior to annealing, any coating on the fiber is preferably removed by immersion in a suitable solvent, e.g., acetone. Alternatively, the fiber may be heated in an oxidizing atmosphere prior to wrapping it on ring 12 to burn off the coating. After placement of the coil holder in the oven, its temperature may be ramped up practically as fast as the oven can be heated; however, after a residence time of 5–15 hours, the rate at which the oven cooled should be carefully controlled, particularly through the glass's transition temperatures, preferably in the range of 15°–25° C. per hour reduction in temperature and, most preferably, about 18° C. per hour. This profile for coil cooling, after annealing, consistently produced sensor coils exhibiting desirable levels of linear and circular birefringence. The present invention is not, however, directed to fiber fabrication or the parameters of the annealing process; rather, it is directed to the mechanical construction of the holders used in annealing, as well as related mechanical components used in packaging the coil subassembly.

While the dimensions of holder 10 vary depending upon the particular application, the following approximate dimensions are considered exemplary. Plate 14 is 15 cm.×30 cm.×6 mm. (6"×12"×¼"). Ring 12 is formed by sandblasting a 6 mm. (¼") wide, 3 mm. (⅛") deep groove 16 with a 10 cm. (2¾") inner diameter. Channels 18 intersect groove 16 at the tangents, and are also 6 mm. (¼") wide and 3 mm. (⅛") deep, although they preferably ramp up toward the edge of plate 14 to about 0.8 mm. (1/32") deep. A hole (not shown), e.g., 10 cm. (2⅔") or less in diameter, may optionally be ground or sandblasted completely through plate 14, inside ring 12, allowing passage of a current-carrying conductor, for testing while the fiber coil is still on the form, or for ultimate incorporation into a Faraday-effect sensor package.

Figure 2:
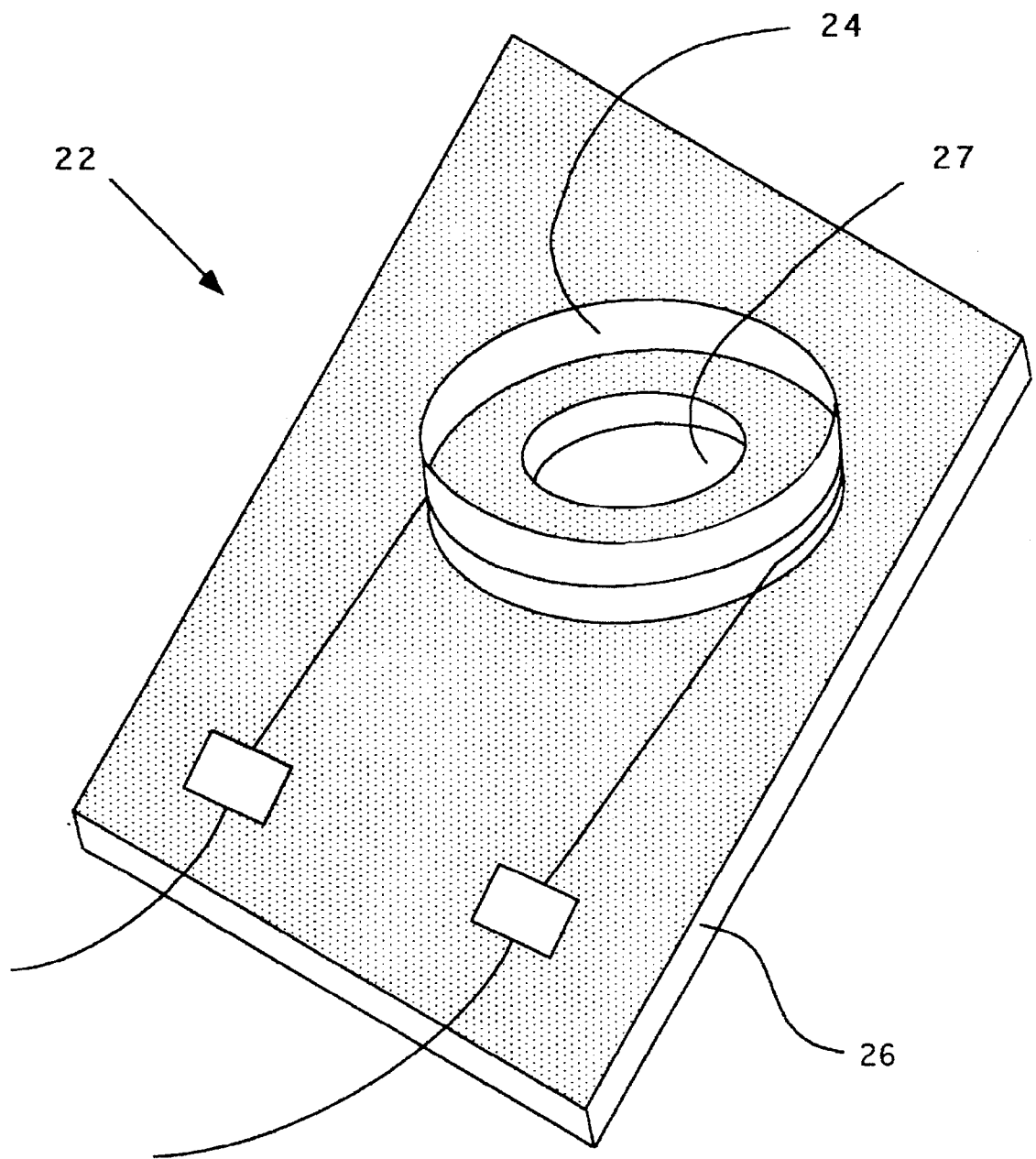
FIG. 2 is a perspective view of an alternative embodiment of the present invention, wherein the coil ring is mounted on the flat substrate.

Referring now to FIG. 2, in an alternative embodiment 22 of the present invention, the ring 24 is physically constructed separate from the plate 26, and is attached to plate 26 by any convenient means, preferably using an inorganic adhesive such as the colloidal silica adhesive sold by Aremco Products, Inc., of Ossining, New York, as Ceramabond 618. Ring 24 and plate 26 are again formed of a material having the same coefficient of thermal expansion as the glass fiber, i.e., silica. The fiber may be coiled around ring 24 prior to attachment to plate 26, and temporarily secured with, e.g., tape. After placement of ring 24 on plate 26, the terminal ends of the fiber coil may be secured near the edge of plate 26 with tape, and the tape on the fiber coil removed. This edge of plate 26 should extend out of the annealing kiln through an insulative barrier so that the tape is not charred. The fiber coil may further be secured around ring 26 using, e.g., the Ceramabond 618 adhesive. A hole 27 may also be provided in holder 22 to allow passage of a conductor such that it can be incorporated directly into the final current sensing device with the annealed fiber coil still in place around ring 24.

With reference now to FIG. 3, the foregoing embodiment may be varied slightly by providing a substrate 28 which is also ring-shaped and may, conveniently, be essentially identical to ring 24; the outer diameters of both rings are approximately equal, and the height of ring 24 must be less than the inner diameter of ring 28. In this manner, with ring 24 positioned upright within ring 28, the terminal ends of the fiber may hang vertically and the coil retains its shape without being pinched. This position for annealing avoids complications of local points of shear which may occur when the fibers overlap one another during annealing.

Another variation of the present invention is shown in FIG. 4, which depicts a coiled tube or helical holder 30 formed of silica. In this exemplary embodiment, tube 30 is coiled 540° with an inner diameter of about 15 cm. (6"). The terminal ends 32 and 34 are optionally turned (preferably at about a 2.5 cm. (1") radius) toward each other in planes separated by about 2.5 cm. (1"), the ends terminating about 6 mm. (¼") from one another. The distance from ends 32 and 34 (projected flat as in FIG. 5) to the closest portion of the coil is about 4.4 cm. (1¾"). The tube itself which forms holder 30 preferably has a 3 mm. (⅒") outer diameter and a 1 mm. (4/100") inner diameter.

A fiber is threaded into holder 30 and placed in the oven; it may be hung. The fiber must, of course, be longer than the uncoiled length of holder 30, and should have sufficient excess length to allow splicing to other fibers. The fiber may be threaded by flowing a gas or liquid, such as water, methanol or acetone, through the coil in the direction that the fiber is to be inserted; this also removes any organic coating on the fiber such as cellulose acetate. The coating may also be removed by passing air through holder 30 during the annealing process, burning it off, and also carrying away any soot. Gases other than normal air (e.g., nitrogen or argon) might be used to help maintain optical fiber strength by excluding water. This procedure could be used to apply materials (vaporized) onto the fiber in order to improve its properties, i.e., provide a passivating surface layer on the fiber after any organic coating has been removed. The coil could be made with a much higher pitch to allow it to be intertwined with an "endless" wire, i.e., that portion of a cable which is distant from its actual ends and should not be severed. The fiber could also be inserted in a straight tube and the tube then formed into the coil. A potting material may optionally be used inside the tube to cushion the fiber against vibrations during movement of the coil assembly.

As further shown in FIG. 5, holder 30 may not only be used to anneal an optical fiber, but may also be directly incorporated into a coil subassembly 36 for a Faraday-effect, magnetic field sensor. The ends of the fiber coil are spliced with the ends of two polarizing ($P_Z$) or polarization-maintaining ($P_M$) fibers 38 and The splices are preferably fusion splices, to avoid an air interface and to aid in maintaining optical alignment and mechanical stability. Straight tubes, preferably silica, are used to protect the splices, and may be threaded onto the ends of fibers 38 and 40 prior to splicing. These tubes also provide strain relief for the $P_Z$ or $P_M$ fiber leads. Only one such tube 42 is used in the embodiment of FIG. 5.

In the specific embodiment of FIG. 5, fibers 38 and 40 are polarizing fibers and coil subassembly is designed for a polarimetric sensor. For such a subassembly, it is necessary that the second $P_Z$ fiber 40 be oriented with its plane of polarization at a 45° angle with respect to the plane of polarization of the first $P_Z$ fiber 38, as extended by the optical fiber within holder 30. The present invention further contemplates a method and subassembly which facilitates proper angular orientation of the fibers. In the depicted embodiment, the first $P_Z$ fiber 38 is fusion spliced to one end of the optical fiber coil within holder 30, but the second $P_Z$ fiber 40 is not directly spliced to the coil. Rather, a pigtail fiber 44, which is pre-terminated in a ferrule 46 (typically made of a ceramic material such as zirconia), is fused to one end 48 of the fiber coil. The pigtail is a piece of single-mode fiber, preferably identical to the fiber used to make the coil. A low-stress epoxy, such as TRA-BOND F112 available from TRA-CON, Inc., Medford, Mass., is used to bond fiber 44 into ferrule 46. The ferrule is then polished to a PC (physical contact, or convex) finish. The other end of fiber 44 is cleaved so that just enough fiber protrudes from ferrule 46 to allow a fusion splice to made.

Pigtail fiber 44 is preferably fused while the free end of ferrule 46 is temporarily held by a small implement, such as an aluminum rod (not shown) with a slightly larger outer diameter than ferrule 46, and a hole in one end for receiving ferrule 46. The outer diameter of the aluminum rod may be approximately equal to that of holder 30 so that a larger quartz tube or sleeve 50 can be threaded over the aluminum rod and later slid over the ferrule and onto end 32 of holder During fusion, the rod may be placed in a V-shaped groove cut into a plate, and the plate attached to the fusion splicer (not shown). End 32 of holder 30 may be similarly held in another plate, and mounted to the opposite side of the splicer. When all the fixtures are in place, the splice is completed. Thereafter, it is preferable to unfasten the plates from the splicer and remove them without relative motion (such as with a small jack) in order to minimize any stresses at the fusion splice point. A third plate having another V-groove may then be placed under the splice, between the first two plates, to support sleeve 50 as it is slipped over the spliced fibers and onto end 32 of holder 30. Once sleeve 50 is in place, as shown in FIG. 5, it is secured to holder 30 and ferrule 46 by any convenient means, particularly a UV curable epoxy such as EM CAST XP 1060-930-45-1A available from Electronic Materials, Inc., of New Milford, Conn. When the epoxy is cured, the plates and aluminum rod are removed.

The other end of the fiber coil (not visible in FIG. 5) is directly fused to the first $P_Z$ fiber 38. Prior to splicing, fiber 38 is loosely held by a small quartz tube 54, preferably one identical to the tubing from which holder 30 is formed. Another sleeve 56 is threaded over tube 54 and fiber 38. The same V-groove plates used above may be used to temporarily secure holder 30 and tube 54 during the splicing procedure. This splice may be made with no concern for the polarization angle. The jack is again used to lift the plates from the splicer after fusion, and the third plate is again used to guide sleeve 56 into the position shown in FIG. 5. Sleeve 56 is bonded to holder 30 and tube 54 using the above-mentioned epoxy. Tube 54, which is preferably about 5 cm. (2") long, may be secured to first $P_Z$ fiber 38 using another UV curable epoxy such as that available from Norland Products, Inc., of New Brunswick, N.J., (epoxy #65).

After pigtail fiber 44 and first $P_Z$ fiber 38 have been attached, second $P_Z$ fiber 40 may be attached while properly orienting its plane of polarization. This is accomplished using another ferrule 58 which is secured to one end of fiber 40 with the same epoxy used above, and also preferably polished to a PC finish. Ferrule 58 is then mounted in a rotator which does not induce any stress on the fiber itself, holder 30 is mounted on a micro-positioning device and light is focused into the free end of first $P_Z$ fiber 38. Two plates (again, preferably silica) are prepared by drilling holes large enough to pass ferrules 46 and 58 but small enough to prevent passage of sleeves 50 and 56. Each of these plates is placed loosely in position over the ferrules, respectively. Several methods, which will become apparent to those skilled in the art, may then be used to determine the polarization state. One such method requires that ferrules 46 and 58 be placed in abutment and, while a light source is connected to the free end of first $P_Z$ fiber 38 and an optical detector is connected to the free end of second $P_Z$ fiber 40, the micro-positioning device is adjusted until maximum light intensity is measured, to obtain proper transverse alignment of the ferrules. The rotator is rotated until light transmission is at a minimum, and then further rotated ±45° in order to align the plane of polarization of second $P_Z$ fiber 40 at a 45° offset with respect to the plane of polarization of first $P_Z$ fiber 38 and the fiber coil. A less precise approach is to rotate until the transmitted light is half of the maximum value. When the ferrules are in proper alignment, an index matching epoxy such as Norland epoxy #81 is applied between them. After this epoxy has cured, plates 60 and 62 are pushed together and a stronger epoxy, such as the EM cast epoxy mentioned above, is injected between the plates and around each ferrule, and cured. Alternative embodiments may provide for polarization alignment during fusion splicing, eliminating the need for ferrules, and allowing the use of curved sleeves and silica tubes to eliminate the horseshoe-shaped ends of holder 30. Alignment during splicing may be accomplished by substituting a single quartz tube, identical to tube 54, for the ferrules and plates, the second $P_Z$ fiber 40 being adhered to this tube. This tube is then rotated to achieve polarization alignment with either of the methods described above, and the splice is immediately fused. Larger quartz tube 50 is again used to affix the additional tube to holder 30.

When coil subassembly 36 is completed, it may be incorporated into a finished Faraday-effect sensor by connecting the free end of first $P_Z$ fiber 38 to a light source, such as a conventional laser (not shown), and connecting the free end of second $P_Z$ fiber 40 to a conventional photodetector (not shown). Thereafter, changes in any current of a cable passing through the fiber coil will be reflected in the intensity of polarized light passing through second $P_Z$ fiber 40 to the photodetector.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, in those embodiments of the holder having a ring with an outer cylindrical wall, an equivalent form could have a hole in the substrate with the optical fiber coil pushed along the inner wall of the hole. It is therefore contemplated that such modifications can be made without departing from the spirit or scope of the present invention as defined in the appended claims.

We claim:

1. A method of making a fiber optic coil subassembly for a Faraday-effect sensor, comprising the steps of:

obtaining an optical fiber having a known coefficient of thermal expansion;

threading said optical fiber through a coiled tubular holder having first and second ends, constructed of a material which has a coefficient of thermal expansion approximately equal to the coefficient of thermal expansion of the optical fiber; and annealing said optical fiber to form an optical fiber coil having first and second ends exiting said first and second ends of said holder, respectively, by heating said holder and optical fiber to at least 550° C. for at least five hours.

2. The method of claim 1 further comprising the steps of:

threading a first end of a first polarizing fiber through a tube member;

sliding a first sleeve member over said first end of said polarizing fiber and said tube member;

splicing said first end of said polarizing fiber to said first end of said fiber coil; and securing a first end of said sleeve member to said first end of said holder, and a second end of said sleeve member to said tube member.

3. The method of claim 1 further comprising the steps of:

obtaining a pigtail fiber having first and second ends, said first end of said pigtail fiber terminating in a ferrule;

splicing said second end of said pigtail fiber to said second end of said fiber coil;

sliding a sleeve member over said first end of said ferrule, said pigtail fiber and said second end of said holder; and securing a first end of said sleeve member to said ferrule, and a second end of said sleeve member to said second end of said holder.

4. The method of claim 2 further comprising the steps of:

obtaining a pigtail fiber having first and second ends, said first end of said pigtail fiber terminating in a first ferrule;

splicing said second end of said pigtail fiber to said second end of said fiber coil;

sliding a second sleeve member over said first end of said ferrule, said pigtail fiber and said second end of said holder; and securing a first end of said second sleeve member to said ferrule, and a second end of said second sleeve member to said second end of said holder.

* * * * *